United States Patent [19]

Zhou et al.

[11] Patent Number: 5,704,993
[45] Date of Patent: Jan. 6, 1998

[54] HIGH CONDUCTIVITY COMPOSITE METAL

[75] Inventors: Ruoyi Zhou; James L. Smith, both of Los Alamos, N. Mex.; John David Embury, Hamilton, Canada

[73] Assignee: The Regents of the Univerisity of California, Office of Technology Transfer, Alameda, Calif.

[21] Appl. No.: 565,523

[22] Filed: Nov. 30, 1995

Related U.S. Application Data

[60] Provisional application No. 60/005,211 Oct. 10, 1995.

[51] Int. Cl.⁶ .................................................. C21D 8/10
[52] U.S. Cl. ......................... 148/96; 148/519; 148/525; 148/530; 148/532; 148/534; 148/536
[58] Field of Search ........................... 148/96, 516, 519, 148/525, 527, 529, 530, 532, 534, 536, 537

[56] References Cited

U.S. PATENT DOCUMENTS

| | | | |
|---|---|---|---|
| 4,078,299 | 3/1978 | Furuto et al. | 148/96 |
| 4,810,593 | 3/1989 | Yamamoto et al. | 148/532 |
| 4,935,594 | 6/1990 | Groos et al. | 148/536 |
| 5,160,550 | 11/1992 | Wong et al. | 148/96 |
| 5,200,004 | 4/1993 | Verhoeven et al. | 148/527 |
| 5,366,569 | 11/1994 | Müller et al. | 148/529 |

FOREIGN PATENT DOCUMENTS

| | | | |
|---|---|---|---|
| 57-123928 | 8/1982 | Japan | 148/532 |

OTHER PUBLICATIONS

The Fabrication and Characterization of High Strength Copper/Stainless Steel Conductors for Pulsed Magnets, Marleen Van Cleemput et al., presented at MT14, Tampere, Finland, Jun. 1995, Paper C-12.

ECAE-Processed Cu-Nb and Cu-Ag Nanocomposite Wires for Pulse Magnet Applications, T. S. Edgecumbe Summers et al.

Development of Cu-Nb Alloy Microcomposite Conductors for High Field Pulsed Magnets by V. I. Pantsyrnyi et al., Bochvar All-Russia Institute of Inorganic Materials, Moscow.

*Primary Examiner*—George Wyszomierski
*Attorney, Agent, or Firm*—Bruce H. Cottrell

[57] ABSTRACT

Electrical conductors and methods of producing them, where the conductors possess both high strength and high conductivity. Conductors are comprised of carbon steel and a material chosen from a group consisting of copper, nickel, silver, and gold. Diffusion barriers are placed between these two materials. The components of a conductor are assembled and then the assembly is subjected to heat treating and mechanical deformation steps.

36 Claims, 5 Drawing Sheets

HIGH CONDUCTIVITY COMPOSITE METAL

FIELD OF THE INVENTION

This invention relates to the field of metallurgy and, more specifically, to electrically conductive metal composites. This invention was made with government support under Contract No. W-7405-ENG-36 awarded by the U.S. Department of Energy. The government has certain rights in the invention.

This application claims the benefit of the priority date of Provisional Application 60/005211 filed Oct. 10, 1995 having the title "High Conductivity Composite Metal" and bearing Attorney Docket No. S-82,696.

BACKGROUND OF THE INVENTION

This invention was made in response to a need for an electrical conductor having higher strength and higher conductivity than currently available conductors. This conductor was developed for use in a high field (100 Tesla) pulse magnet which is currently being designed. A conductor used in the coils of a long-pulse high field magnet must have high conductivity in order to minimize resistance heating during operation of the magnet. Also, the conductor is subjected to tensile stress by the Lorentz force imposed on the coils by means of their presence in the magnetic field. Thus, the conductor must possess high strength. These required properties are relative to the size (cross-sectional area) of the conductor, that is, the conductor must exhibit high conductance and strength when in the form of a small diameter wire. Conductors of currently available materials, such as beryllium-copper, copper/niobium, copper/stainless steel, and Glidcop (a trade name for a dispersion of alumina in copper), do not meet both the strength and conductivity requirements specified for the coils of the above-mentioned pulse magnet. Silver, copper, and aluminum are good conductors but lack strength and hardness and silver is quite expensive. Combining these materials with other materials possessing sufficient strength provides conductors having insufficient conductivity for use in pulse magnets. It is expected that other uses of this invention will include windings of electric motors, electric transmission lines, and mechanical batteries (which are very high speed electric motors). The cost of producing conductors of this invention will be considerably lower than that of other conductors in this class except for conductors of Cu/stainless steel, which possess a good deal less strength. In this invention, materials of low strength which are good electrical conductors are combined with carbon steel to utilize its strength.

SUMMARY OF THE INVENTION

This invention is electrical conductors and methods of producing them, where the conductors possess both high strength and high conductivity. Conductors are comprised of carbon steel and a material chosen from a group consisting of copper, nickel, silver, and gold. Diffusion barriers are placed between these two materials. The components of a conductor are assembled and then the assembly is subjected to heat treating and mechanical deformation steps.

In one embodiment, the invention is a method for making an electrical conductor comprising providing a core element of carbon steel having an elongated generally cylindrical shape and a carbon content of from about 0.3 to about 0.8 weight percent; covering the elongated surface of said core element with a diffusion barrier; placing said covered core element inside a hollow cylinder of a highly conductive material to form an assembly, where said material is chosen from a group consisting of copper, nickel, silver, and gold; evacuating air from said assembly and sealing the ends of the assembly to maintain its interior in the evacuated condition; annealing the assembly; mechanically deforming the assembly by reducing its cross-sectional area to form a billet; heating said billet to a temperature greater than austenization temperature and maintaining it at that temperature for a time period effective for austenization to take place; rapidly cooling the billet to a temperature of from about 270 to about 310 C.; heating the billet to a temperature of from about 400 to about 500 C. and maintaining its temperature within that range for a time period of from about 5 to about 20 minutes; rapidly cooling the billet to a temperature of less than about 200 C.; and mechanically deforming the billet by reducing the cross-sectional area of the billet to form a conductor.

In another embodiment, the invention is a method of making an electrical conductor comprising providing a core element of a highly conductive material having an elongated generally cylindrical shape, where said material is chosen from a group consisting of copper, nickel, silver, and gold; covering the elongated surface of said core element with a diffusion barrier; placing said covered core element inside a hollow cylinder of carbon steel having a carbon content of from about 0.3 to about 0.8 weight percent to form a first assembly; covering the elongated surface of said first assembly with a diffusion barrier; placing said covered first assembly in a hollow cylinder of a highly conductive material to form a second assembly, where said material is chosen from a group consisting of copper, nickel, silver, and gold; evacuating air from said second assembly and sealing the ends of the second assembly to maintain its interior in the evacuated condition; annealing the second assembly; mechanically deforming the second assembly by reducing its cross-sectional area to form a billet; heating said billet to a temperature greater than austenization temperature and maintaining it at that temperature for a time period effective for austenization to take place; rapidly cooling the billet to a temperature of from about 270 to about 310 C.; heating the billet to a temperature of from about 400 to about 500 C. and maintaining its temperature within that range for a time period of from about 5 to about 20 minutes; rapidly cooling the billet to a temperature of less than about 200 C.; and mechanically deforming the billet by reducing the cross-sectional area of the billet to form a conductor.

BRIEF DESCRIPTION OF THE DR&WINGS

DETAILED DESCRIPTION OF THE INVENTION

Figure 1:
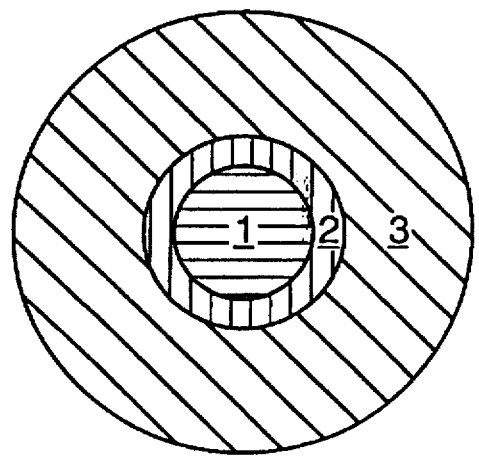
FIG. 1 is a section view taken perpendicular to the longitudinal axis of an assembly consisting of a core element, a diffusion barrier, and an outer element before mechanical deformation. It is not to scale.

FIG. 1 depicts, in cross-section, an assembly used in an embodiment of this invention which is termed CS/Cu 1. Core element 1 is of carbon steel (CS) and has the shape of an elongated cylinder, or rod. It is not necessary that core element 1 be strictly cylindrical, but it will be seen that large differences in diameter along the length of the core element are undesirable in that such differences will increase difficulty of fabrication and affect homogeneity of the finished conductor. The core element is covered, on its elongated surface, with diffusion barrier 2. Surrounding diffusion barrier 2 is an outer element, which is a hollow cylinder of a material of high electrical conductivity. The length of the assembly is chosen with regard to the length of the finished conductor which is desired at completion of the process of this invention.

In proof of principle experiments dealing with the CS/Cu 1 embodiment of the invention, two assemblies were made, one having a core element of 1045 steel (carbon steel with 0.45 wt % carbon) and one having a core element of 1070 steel (0.70 wt % carbon). The core elements, or rods, were 19 mm in diameter by 100 mm long. The rods were cleaned by degreasing with methanol followed by etching with acid to remove additional surface contamination and oxides and a rinse with deionized water. The elongated surface of each cleaned rod was covered, or wrapped, with two layers of niobium foil, where each layer had a thickness of 0.005 in. (0.127 mm). There was a small overlap so that a small portion of each rod was covered by three layers of foil. The foil was annealed sheet niobium provided by Cabot Corp. of Boyertown, Pa. To form assemblies, each covered core element was placed in a can, or hollow cylinder, of oxygen free high conductivity (OFHC) copper having an inside diameter of 21 mm and in outside diameter of 50 mm. These two assemblies were placed in a vacuum chamber and their ends were sealed by welding a plate to one end and an extruding cone to the other end of each can. The assemblies were then annealed by heating to a temperature of about 700 C. and held at that temperature for about 3 hours. Each assembly was then extruded, or mechanically deformed to reduce its cross-sectional area, from 50 mm to 12.7 mm in diameter to form a billet. Starting at this point in the process, multiple samples were prepared and tested. A 25 cm. long piece was cut from each billet and placed in a furnace maintained at about 920 C. for about 30 min. The two billets, or portions of billets, were then allowed to cool in air to about 290 C. and, after cooling, were placed into a furnace maintained at 450 C. for 10 minutes. The billets were then quenched in water which was at room temperature. After quenching, the billets were machined to a diameter of 8.25 mm in order to remove surface contamination and obtain the desired volume ratio of copper to steel of about 1.8. The machined billets contained, by volume, 63% Cu, 35% steel, and 2% Nb.

The billets were then mechanically deformed to reduce their cross-sectional area by swaging and wire drawing using conventional equipment. Each billet was swaged to a diameter of about 7 mm and then subjected to wire drawing steps with an area reduction of about 20% per step. Some portions of the wire resulting from this process broke during wire drawing at an area reduction of about 96%. The area reduction percentage is based on an initial area calculated from the before-swaging diameter of 8.25 mm and is calculated by dividing initial area into initial area minus final area. Broken samples exhibited a center-burst mechanism, due to the hard core. Mechanical strength of samples of wire was tested in tension using an Instron Model 1125 tensile tester. Crosshead speed was 2 mm per minute. An extensometer was used to obtain accurate strain values. Resistivity of samples was measured at liquid nitrogen temperature and at room temperature by the four-probe method. At the elevation at which measurements were made, temperature of liquid nitrogen is 75K instead of 77K.

Copper, nickel, silver, or gold are utilized in the inventive conductors. Though only conductors comprised of copper were made, it is believed that the metallurgical properties of nickel, silver, and gold are appropriate to permit their use. An attempt to make a conductor of aluminum and carbon steel was not successful. Since silver and gold are quite expensive, it is expected that their use in the inventive conductors will be limited to applications such as electronics. Carbon steel having a carbon content of from about 0.3 to about 0.8 weight percent carbon may be used. The high strength of the inventive conductors is due mainly to the presence of fine lamellar pearlite in the CS; pearlite is obtained by means of the heat treating steps described herein. At 0.8% C, the microstructure will be entirely pearlitic. Below 0.8% C, ferrite and pearlite will be present in the CS component of a composite.

It is desirable to clean the materials before assembling them to avoid incorporating contaminants into a conductor which may reduce conductivity and strength. Also, if a conductor has a very small diameter, a contaminant at one location can make useless the length of the conductor which contains the contaminant. For the same reasons, it is desirable to use pure and homogenous materials. For example, an inclusion in CS used in a conductor can cause the conductor to break during size reduction or cause a weak spot in a finished conductor.

The purpose of the diffusion barrier is to prevent degradation of the conductivity of the highly conductive material by means of mixing with the CS, since components of the steel will diffuse into the Cu at high temperatures. Niobium has low solubility in Cu and mechanical properties compatible with Cu and steel. In addition to niobium, vanadium or tantalum may serve as a diffusion barrier. The diffusion barrier thickness which is required is that which will remain effective in substantially separating the two materials during size reduction. If the barrier is too thin, the copper and CS layers will come into contact with one another and diffusion will take place. If the barrier is thicker than necessary to prevent contact, the electrical and mechanical properties of the barrier material contribute unduly to the properties of a conductor, thus diluting the desirable properties of both the Cu (or other conductor) and pearlitic CS. It is believed that the thickness of the diffusion barrier should be about 0.01 times the diameter, before deformation, of the material surrounded by the barrier. The degree of size reduction to obtain the final conductor will determine the degree of thinning of the barrier and, therefore, the needed thickness of the barrier.

An assembly is annealed before it is subjected to the initial size reduction in order to treat the component metals for the purposes of relieving internal stresses and making the components soft and more homogenous. Annealing conditions which are used depend on the compositions of the particular materials. Annealing temperature will be within the range of from about 600 to about 900 C. and the annealing time will be from about 3 to about 5 hours.

Mechanical deformation to reduce the cross-sectional area of an assembly will normally be accomplished by means of extrusion, which will usually be done at a temperature between about 600 and 800 C. The area reduction should be at least about 2 to 1, that is, the diameter of a billet should be about half or less than half the diameter of the assembly from which it is formed. This is required to achieve mechanical bonding of the components of an assembly.

After the first size reduction, a billet is heated to a temperature above the austenization temperature, which is the temperature above which CS has an austenitic microstructure. This temperature varies with carbon content and is about 900 C. for a carbon content of 0.3% and about 723 C. when 0.8% carbon is present in the CS. The upper limit shown on phase diagrams for the existence of austenite in the 0.3–0.8% C range varies between about 1493 C. and 1380 C. Of course, the temperature during austenization cannot exceed the melting point of the high conductivity component of the billet, which is 1084 C. in the case of copper. The billet must be held above the austenizing temperature for a time period effective for substantial transformation to austenite to take place. The austenizing step provides a homogenous phase which will more easily convert to lamellar pearlite.

After austenization, a billet is rapidly cooled to a lower temperature in order to initiate growth of fine lamellar pearlite. It is preferable that the pearlite have a fine structure, that is, that the space between lamellae be small, since fine pearlite is stronger than coarse pearlite. A scanning electron micrograph of a CS/Cu 1—1070 sample showed that interlameller spacing of its pearlite microstructure was about 90 nanometers. Rapid cooling is required in order that substantial transformation of the microstructure to fine lamellar pearlite will take place; slow cooling will result in transformation of the austenite to coarse pearlite and bainite rather than fine lamellar pearlite. The small sizes of the samples in the experimentation described herein permitted air cooling to be used (a fan was used to blow air on the samples). Large billets will be quenched in lead baths or similar means in order to achieve a sufficiently rapid cooling rate. It is believed that the optimum temperature for this quench step is about 290 C. The purpose is to cause nucleation for growth of fine lamellar pearlite. It is believed that use of a quench temperature of about 310 C. will result in coarse lamellar pearlite, though the conductors produced using 310 C. will still possess sufficient strength for many applications. Similarly, it is believed that use of a quench temperature of about 270 C. will result in formation of bainite and pearlite, which will result in less strength and greater brittleness. An appropriate range for this step is from about 270 to about 310 C.

After the first quench, the billet is heated to a temperature effective for further growth of lamellar pearlite. Heating should not be delayed, as bainite will begin to form at the quench temperature. It is believed that the optimum temperature for this heat soak step is about 450 C. and that hold time at this temperature should be about 10 min. Use of heat soak parameters of 400 C. and 20 min. resulted in an increased amount of bainite. Samples held at 500 C. for 5 min. and 475 C. for 10 min. exhibited a relatively coarse microstructure. Holding at, say, 500 C. for a long period of time, about an hour, will result in formation of spheroidal pearlite, which is less strong. It is believed that the limits of temperature for this step are from about 400 to about 500 C. and the time period limits are from about 5 to about 20 min.

After the heat soak step, the billet is rapidly cooled in order to prevent transformation of the fine lamellar pearlite to coarse lamellar pearlite. Normally, a billet will be quenched in water. The temperature of the quench liquid should be less than about 200 C.

After heat treatment, the billet is subjected to mechanical deformation. Strength of a conductor increases with degree of size reduction. Thus, the size of the starting assembly must be determined with reference to the size of the final conductor, so that the amount of reduction applied will be sufficient to attain the desired strength. Generally, the amount of size reduction used in practice of the invention is expected to be about 90% or more.

Conductors may be annealed one or more times between steps of the mechanical deformation process. If a single anneal is to be done, it may be done after 90% area reduction is achieved. Wire drawing would then be continued to the final diameter. This intermediate anneal will relieve internal stresses and soften the conductor. Annealing parameters will depend on the application; one set of parameters is 300 C. for 1 hour.

Conductors may be annealed after completion of mechanical deformation. A final low temperature anneal will improve ductility, conductivity, and yield strength (but not ultimate tensile strength). This step may be conducted at a temperature of 250 C. for 1 hour.

Figure 2:
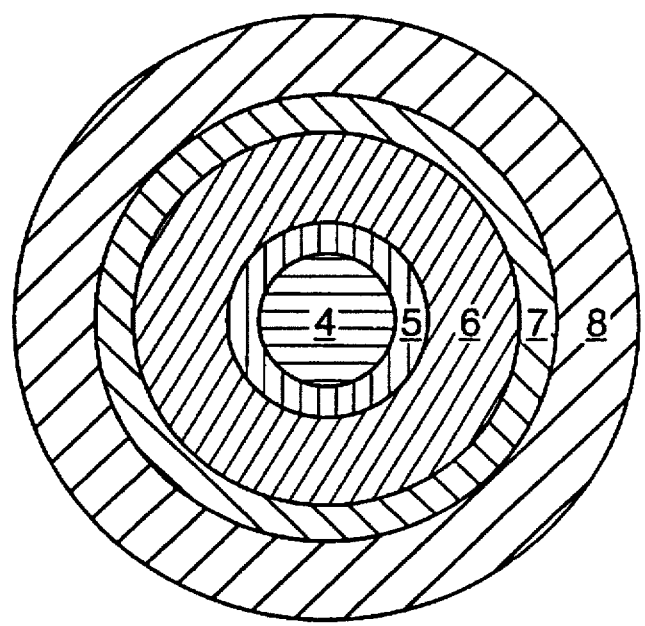
FIG. 2 is a section view taken perpendicular to the longitudinal axis of an assembly consisting of a core element, a diffusion barrier, a middle element, a diffusion barrier, and an outer element before mechanical deformation. It is not to scale.

FIG. 2 depicts, in cross-section, an assembly used in an embodiment of the invention which is termed CS/Cu 2. Core element 4 is of a highly conductive material and is covered with diffusion barrier 5 and then placed in carbon steel can 6, which is termed the middle element. Can 6 is covered with diffusion barrier 7 and placed in an outer element, or hollow cylinder, of a highly conductive material, denoted by reference no. 8. In proof of principle experimentation, two OFHC copper rods, each having a diameter of 10 mm, were wrapped with niobium foil as described above and placed in 50 mm long CS cylinders having inside diameters of 11 mm and outside diameters of 19 mm to form a first assembly. One first assembly contained 1045 steel and the other contained 1070 steel. Each steel cylinder was wrapped with two layers of niobium foil and placed in an OFHC Cu can having an inside diameter of 20 mm and an outside diameter of 27 mm, thereby forming a second assembly. Components were cleaned as described above before assembly. The composition of each second assembly, by volume, was 64.58% Cu, 33.25% CS, and 2.16% Nb. The Cu core alone was 16.29% of the total volume. The second assemblies were sealed by electron beam welding in a low pressure chamber and annealed, as described above. They were then extruded to diameters of 8.25 mm to form billets. The billets were heat treated as described above in connection with the CS/Cu 1 embodiment. After heat treatment, the billets were etched in 50% nitric acid to remove oxidation from their surfaces. The billets were then swaged and wire-drawn, also as described above. The CS/Cu 2 composites were easier to draw than the CS/Cu 1 samples and were drawn to an area reduction of 99% without breakage.

The Table provides comparisons between the invention and prior art conductors. Strain is expressed as the logarithm to the base 10 of the quantity initial area divided by final area, where the initial area is that of the conductor before deformation and final area is after deformation. Conductivity is expressed as a percentage of the International Annealed Copper Standard (IACS). CS/Cu 1 has higher strength than all but two conductors and those two contain an expensive material. Glidcop and ECAE Cu/Ag possess higher conductivity than CS/Cu 1 at room temperature, but CS/Cu 1 conductivity at liquid nitrogen temperature is greater. CS/Cu 2 is the strongest of the group and its liquid nitrogen conductivity is exceeded only by CS/Cu 1. Since conductivity of copper decreases with increased degree of cold working, it is expected that a final anneal will increase conductivity of both inventive composites. CS/Cu 2 exhibits lower liquid nitrogen conductivity than CS/Cu 1 because it was subjected to a greater mount of deformation.

TABLE

|  | Ultimate Strength, GPa | Room Temp. Conductivity, % IACS | Liq. Nit. Conductivity, % IACS | Strain Ao/A |
|---|---|---|---|---|
| Glidcop | 0.6 | 79 | N/A | N/A |
| Cu/Be | 0.9 | 57 | N/A | N/A |
| Cu/Nb | 1.1 | 65 | 318 | 10$^c$ |
| Cu/SS | 0.8 | 56 | 354 | 4.4 |
| ECAE Cu/Ag | 1.1 | 76 | 243 | 2.6 |
| Cu/Ag | 1.5 | 65 | 250$^a$ | 5.8 |
| Cu/Nb/Ag | 1.3 | 64 | 250$^b$ | 7.2 |
| CS/Cu 1 | 1.2 | 62 | 450 | N/A |
| CS/Cu 2 | 1.67 | 62 | 403 | 4.2 |

Notes to Table:
$^a$Value is an estimate.
$^b$Value is less than 250.
$^c$Strain is less than 10.

Figure 3:
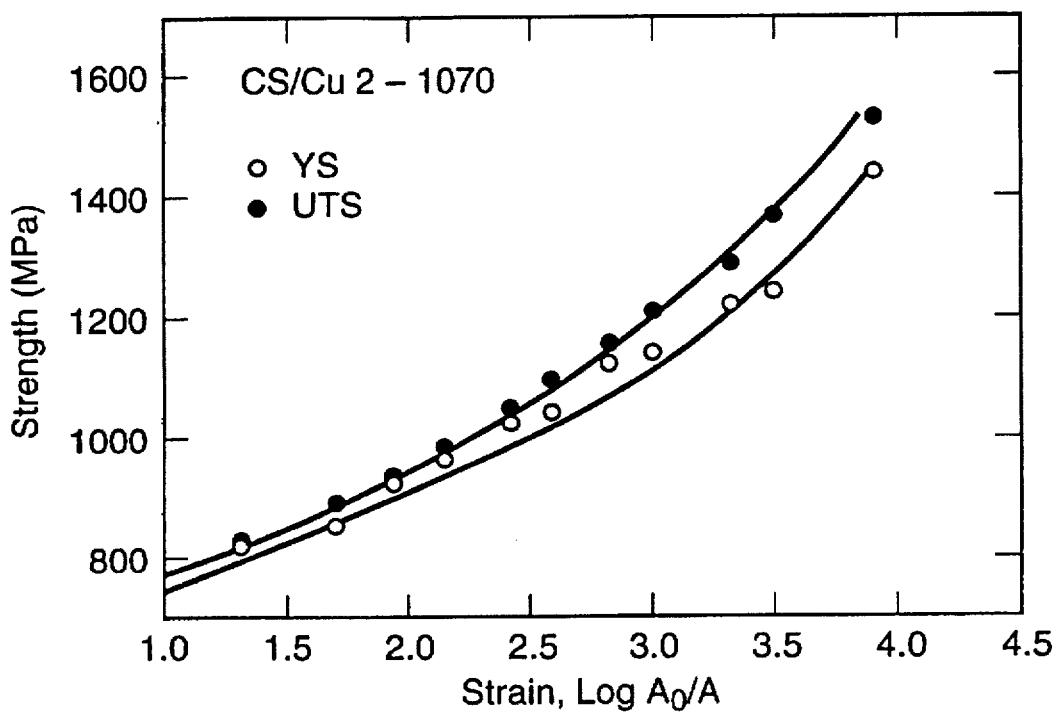
FIGS. 3 and 4 show ultimate tensile strengths of samples obtained with varying degrees of mechanical deformation.
Figure 4:
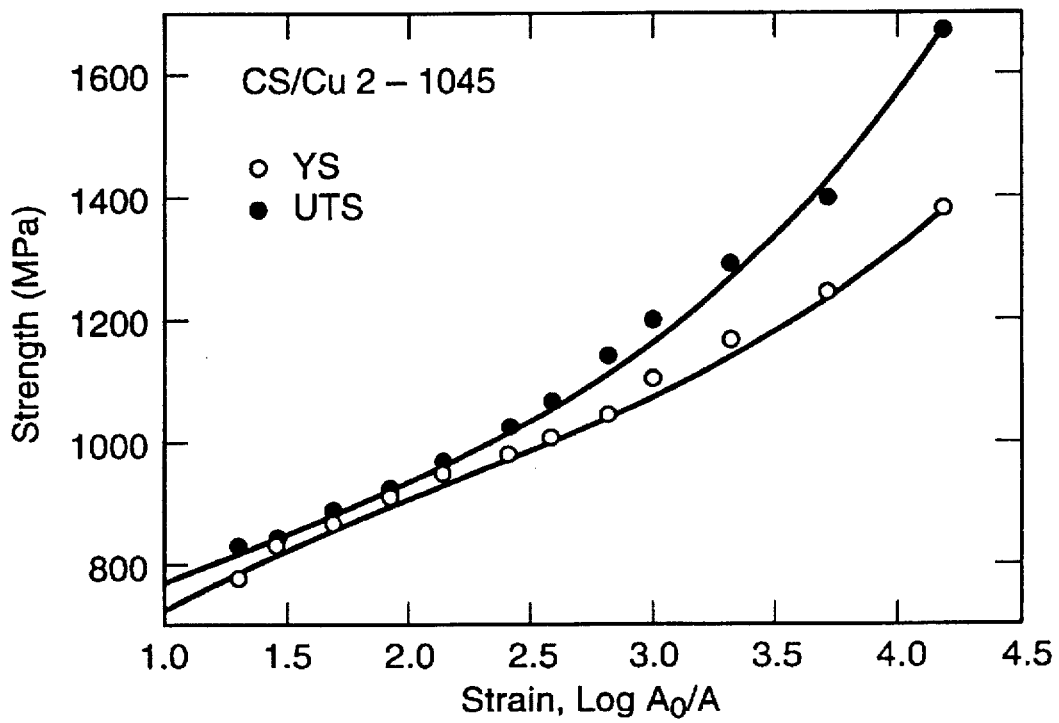
Figure 5:
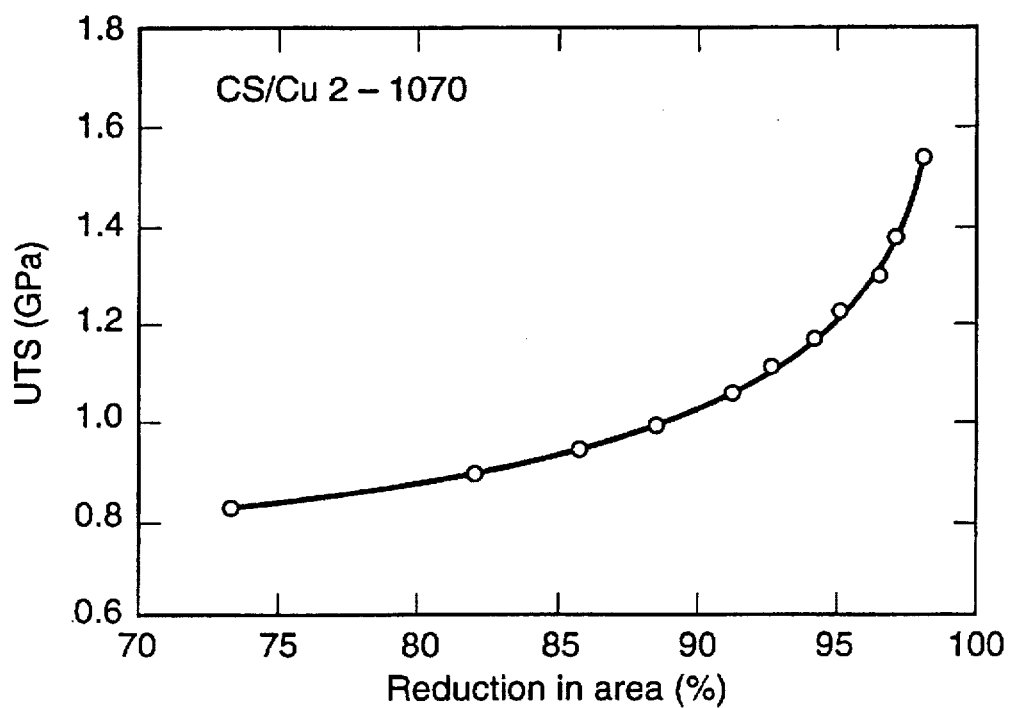
FIGS. 5 and 6 show the data of FIG. 3 and 4, but with the degrees of mechanical deformation expressed in a different manner.
Figure 6:
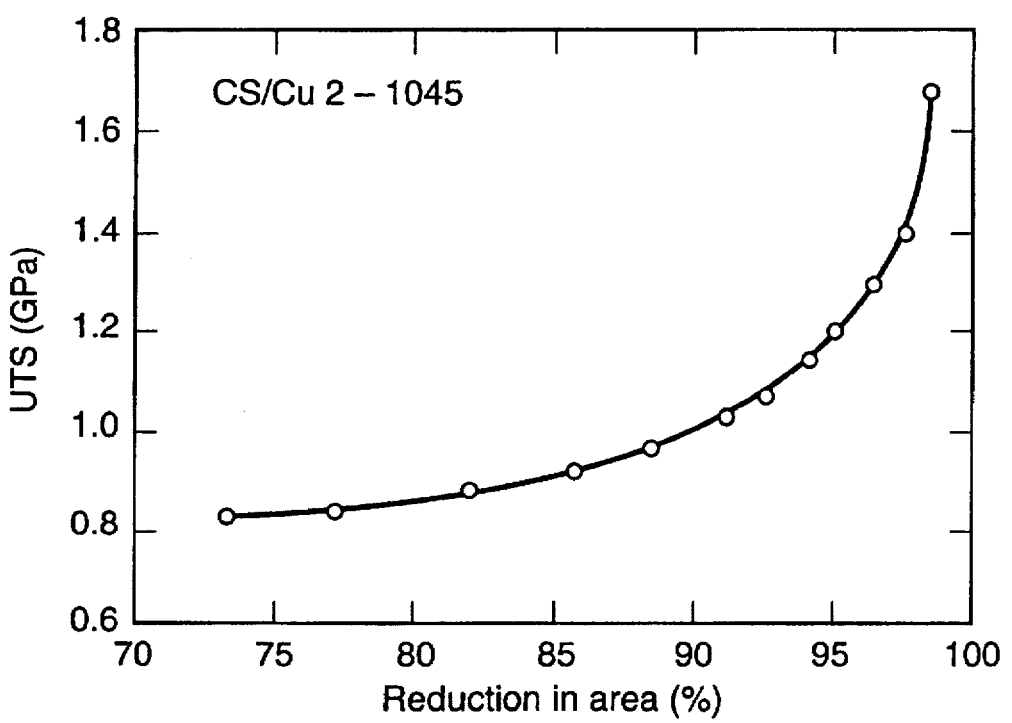

FIGS. 3 and 4 show yield strengths and ultimate tensile strengths of CS/Cu 2 samples plotted against degree of strain (defined above). FIGS. 5 and 6 present the same UTS data, but with strain expressed as reduction in area (defined above). It would be expected that the samples of 1070 steel would be stronger, as 1070 will have a higher percentage of pearlite than 1045. It is believed likely that additional experimentation would provide conductors of 1070 steel having a higher strength than 1045 conductors.

Figure 7:
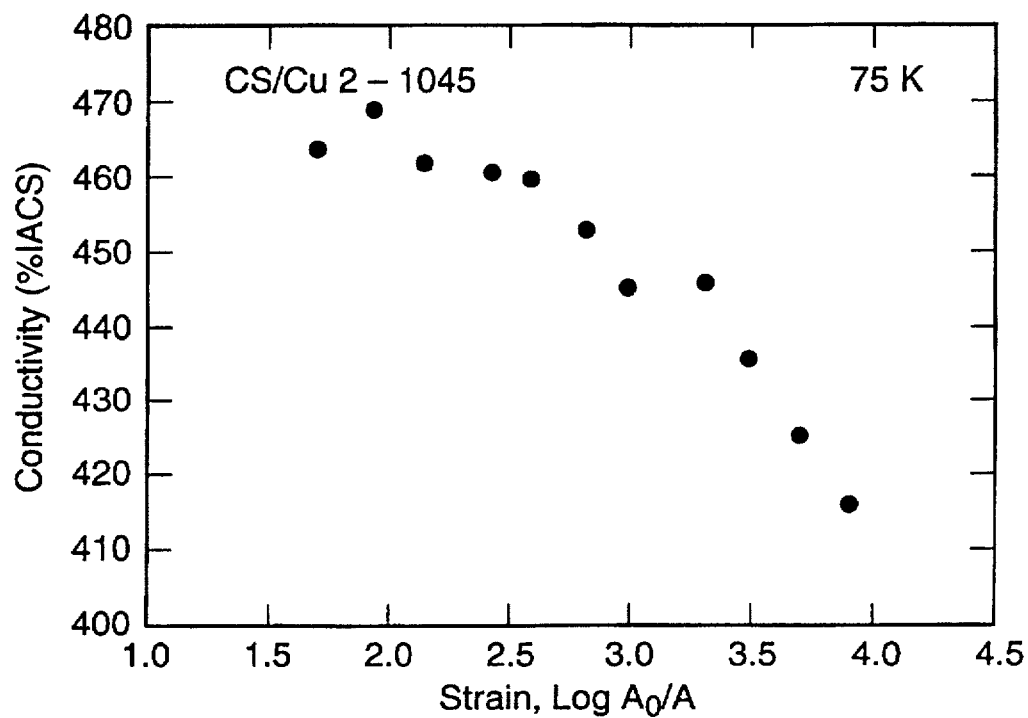
FIGS. 7 and 8 show conductivities (% of IACS) at 75K (liquid nitrogen) and room temperature of samples which were subjected to varying degrees of mechanical deformation.
Figure 8:
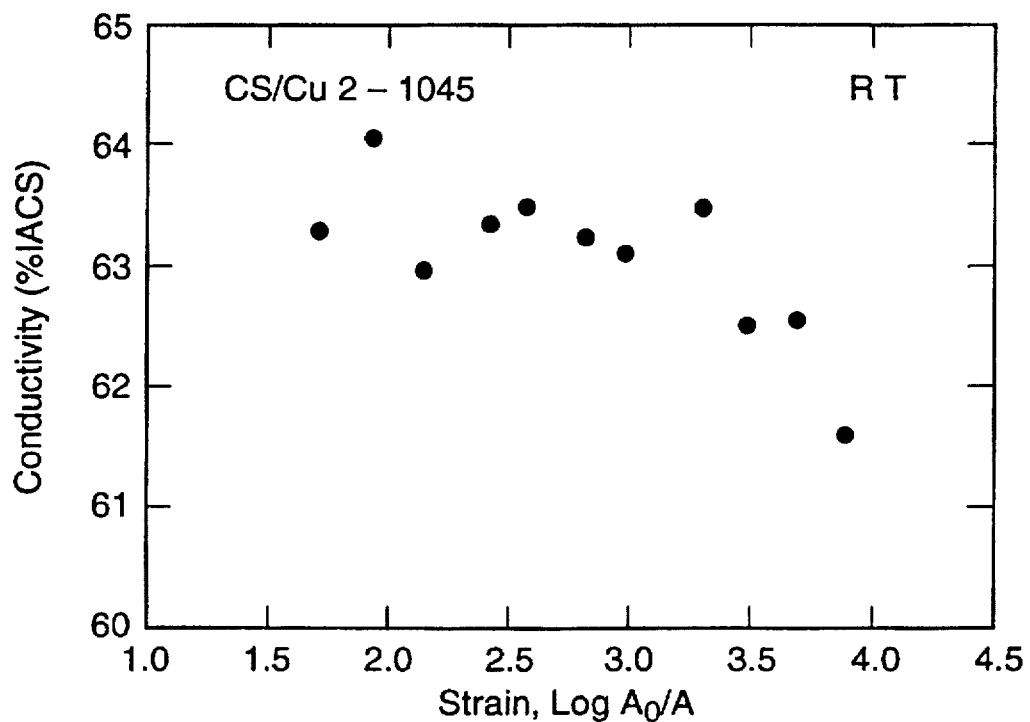
Figure 9:
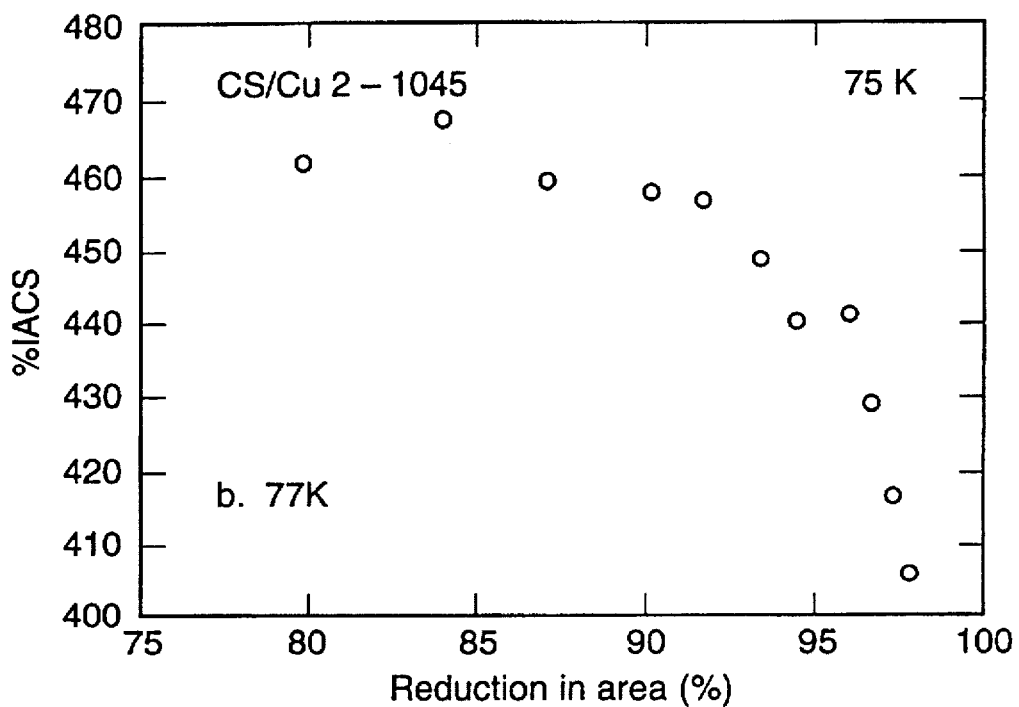
FIGS. 9 and 10 show the data of FIGS. 7 and 8, but with the degree of mechanical deformation expressed in a different manner.
Figure 10:
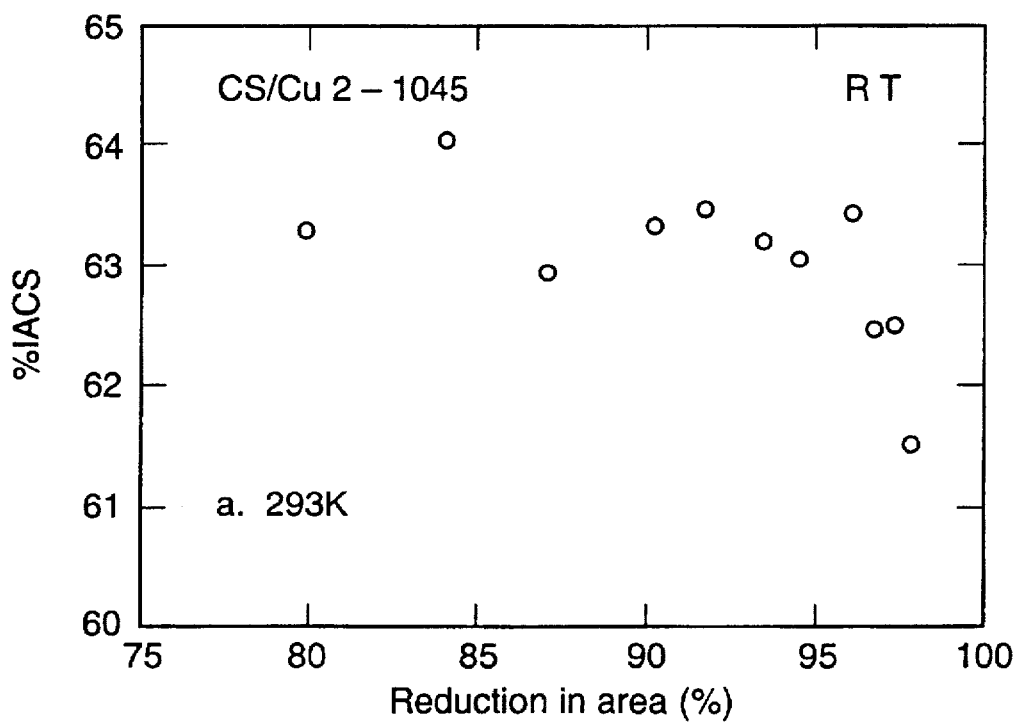

FIGS. 7 and 8 show conductivities at liquid nitrogen temperature and at room temperature of CS/Cu 2 samples made with 1045 steel plotted against amount of strain. FIGS. 9 and 10 show the same data, but with reduction in area on the X-axis. The data points which are higher than expected from viewing all of the data are within the expected limits of experimental error.

The assemblies should be evacuated to a pressure of at least about $10^{-4}$ Torr and $10^{-5}$ Torr is preferable.

What is claimed is:

1. A method for making an electrical conductor comprising:
   a. providing a core element of carbon steel having an elongated generally cylindrical shape and a carbon content of from about 0.3 to about 0.8 weight percent;
   b. covering the elongated surface of said core element with a diffusion barrier;
   c. placing said covered core element inside a hollow cylinder of a highly conductive material to form an assembly, where said material is chosen from a group consisting of copper, nickel, silver, and gold;
   d. evacuating air from said assembly and sealing the ends of the assembly to maintain its interior in the evacuated condition;
   e. annealing the assembly;
   f. mechanically deforming the assembly by reducing its cross-sectional area to form a billet;
   g. heating said billet to a temperature greater than austenization temperature of said carbon steel and maintaining it at that temperature for a time period effective for austenization to take place;
   h. rapidly cooling the billet to a temperature of from about 270° C. to about 310° C.;
   i. heating the billet to a temperature of from about 400° C. to about 500° C. and maintaining its temperature within that range for a time period of from about 5 to about 20 minutes;
   j. rapidly cooling the billet to a temperature of less than about 200° C.; and
   k. mechanically deforming the billet by reducing the cross-sectional area of the billet to form a conductor.

2. The method of claim 1 where said diffusion barrier is chosen from a group consisting of niobium, vanadium, and tantalum.

3. The method of claim 1 where said diffusion barrier is effective to separate the highly conductive material from the carbon steel after mechanical deformation is complete.

4. The method of claim 1 where step d comprises placing the assembly in an evacuated electron beam welding chamber and using electron beam welding to attach closures to the ends of the assembly.

5. The method of claim 1 where step d comprises evacuating the assembly to a pressure of at least $10^{-5}$ Torr.

6. The method of claim 1 where step e comprises annealing the assembly at a temperature of from about 600° C. to about 900° C. for a period of from about 3 to about 5 hours.

7. The method of claim 1 where step f comprises mechanically deforming the assembly by extrusion.

8. The method of claim 1 where step f comprises mechanical deforming the assembly at temperatures of from about 600° C. to about 800° C.

9. The method of claim 1 where step k comprises mechanically deforming the billet by swaging and wire-drawing.

10. The method of claim 1 where step k comprises mechanically deforming the billet in a plurality of stages and further comprising an intermediate anneal between each of said stages.

11. The method of claim 10 where said annealing is done at a temperature of about 300° C. for about 1 hour.

12. The method of claim 1 further comprising a step of annealing the conductor after mechanical deformation is complete.

13. The method of claim 1 where step k comprises reducing the cross-sectional area of the billet by 90%.

14. The method of claim 1 where the temperature of step g is about 920° C.

15. The method of claim 1 where the time period of step g is about 30 minutes.

16. The method of claim 1 where the rapid cooling of step h is done by immersing the billet in a liquid at a temperature of from about 270° C. to about 310° C.

17. The method of claim 1 where the heating of step i is accomplished immediately after the rapid cooling of step h.

18. The method of claim 1 where the temperature of step h is about 290° C.

19. The method of claim 1 where the temperature of step i is about 450° C.

20. The method of claim 1 where the time period of step i is about 10 min.

21. A method for making an electrical conductor comprising:
   a. providing a core element of a highly conductive material having an elongated generally cylindrical shape, where said material is chosen from a group consisting of copper, nickel, silver, and gold;
   b. covering the elongated surface of said core element with a diffusion barrier;
   c. placing said covered core element inside a hollow cylinder of carbon steel having a carbon content of from about 0.3 to about 0.8 weight percent to form a first assembly;

d. covering the elongated surface of said first assembly with a diffusion barrier;

e. placing said covered first assembly in a hollow cylinder of a highly conductive material to form a second assembly, where said material is chosen from a group consisting of copper, nickel, silver, and gold;

f. evacuating air from said second assembly and sealing the ends of the second assembly to maintain its interior in the evacuated condition;

g. annealing the second assembly;

h. mechanically deforming the second assembly by reducing its cross-sectional area to form a billet;

i. heating said billet to a temperature greater than austenization temperature of said carbon steel and maintaining it at that temperature for a time period effective for austenization to take place;

j. rapidly cooling the billet to a temperature of from about 270° C. to about 310° C.;

k. heating the billet to a temperature of from about 400° C. to about 500° C. and maintaining its temperature within that range for a time period of from about 5 to about 20 minutes;

l. rapidly cooling the billet to a temperature of less than about 200° C.; and m. mechanically deforming the billet by reducing the cross-sectional area of the billet to form a conductor.

22. The method of claim 21 where said diffusion barrier is chosen from a group consisting of niobium, vanadium, and tantalum.

23. The method of claim 21 where said diffusion barrier is effective to separate the highly conductive material from the carbon steel after mechanical deformation is complete.

24. The method of claim 21 where step f comprises placing the second assembly in an evacuated electron beam welding chamber and using electron beam welding to attach closures to the ends of the assembly.

25. The method of claim 21 where step f comprises evacuating the second assembly to a pressure of at least $10^{-5}$ Torr.

26. The method of claim 21 where step q comprises annealing the second assembly at a temperature of from about 600° C. to about 900° C. for a period of from about 3 to about 5 hours.

27. The method of claim 21 where step h comprises mechanically deforming the second assembly by extrusion.

28. The method of claim 21 where step h comprises mechanical deforminq the second assembly at temperatures of from about 600° C. to about 800° C.

29. The method of claim 21 where step m comprises mechanically deforming the billet by swaging and wire-drawing.

30. The method of claim 21 where step m comprises mechanical deforming the billet in a plurality of stages and further comprising an intermediate anneal between each of said stages.

31. The method of claim 21 where said annealing is done at a temperature of about 300° C. for about 1 hour.

32. The method of claim 21 further comprising a step of annealing the conductor after mechanical deformation is complete.

33. The method of claim 21 where step m comprises reducing the cross-sectional area of the billet by 90%.

34. The method of claim 21 where the temperature of step i is about 920° C.

35. The method of claim 21 where the time period of step i is about 30 minutes.

36. The method of claim 21 where the rapid cooling of step j is done by immersing the billet in a liquid at a temperature of from about 270° C. to about 310° C.

* * * * *